Feb. 14, 1961 E. K. SMITH 2,971,436
REAR VIEW MIRROR STRUCTURE
Filed Nov. 4, 1957

INVENTOR.
EPHRAIM K. SMITH
BY
Whittemore, Hulbert & Belknap
ATTORNEYS

United States Patent Office 2,971,436
Patented Feb. 14, 1961

2,971,436

REAR VIEW MIRROR STRUCTURE

Ephraim K. Smith, 680 Washington Road,
Grosse Pointe 30, Mich.

Filed Nov. 4, 1957, Ser. No. 694,199

5 Claims. (Cl. 88—98)

This invention relates generally to rear view mirrors, and refers more particularly to adjustable rear view mirrors for motor vehicles.

One of the essential objects of the invention is to provide the mirror with means by which it may be initially adjusted or set by hand to the position desired and by which it will return automatically to such adjusted or set position without further adjustment in the event it should be moved accidentally from said adjusted or set position.

Another object is to provide a single means by which the mirror may be adjusted or set by hand to obtain any desired adjustment within 360° and by which the mirror will be returned automatically to said adjusted or set position.

Another object is to provide the mirror with a mounting that includes means by which the adjustment and return aforesaid of the mirror may be easily and quickly accomplished and that includes means for eliminating any metal to metal contact between the mirror and its mounting during either the adjustment or return mentioned.

Another object is to provide a rear view mirror structure comprising parts that may be individually replaced whenever desired.

Another object is to provide a rear view mirror structure that is simple in construction, economical to manufacture, and efficient in use.

Other objects, advantages and novel details of construction of this invention will be made more apparent as this description proceeds, especially when considered in connection with the accompanying drawing, wherein.

Figure 1:
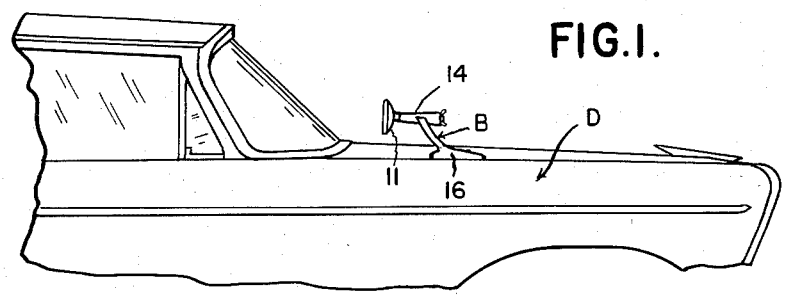
Figure 1 is a fragmentary side elevation of a motor vehicle provided with a rear view mirror structure embodying my invention.
Figure 2:
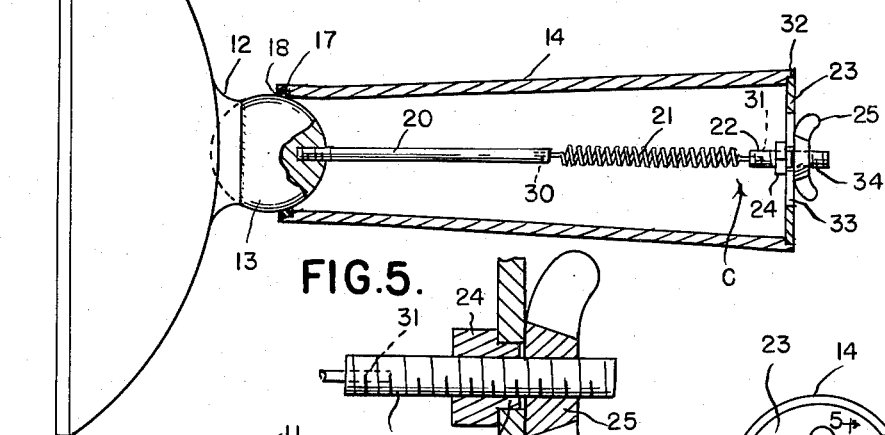
Figure 2 is an enlarged longitudinal vertical sectional view through a portion of the mirror structure illustrated in Figure 1, with parts broken away and in section.
Figure 5:
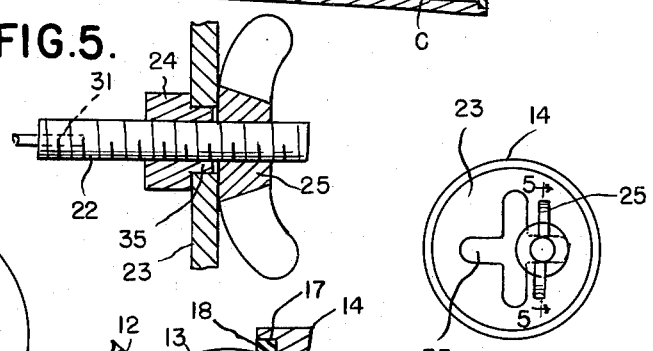
Figure 5 is an enlarged sectional view taken substantially in the line 5—5 of Figure 3.
Figure 3:
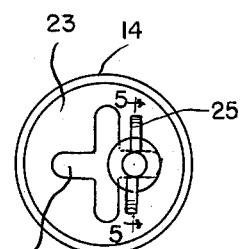
Figure 3 is an end view of the structure shown in Figure 2.
Figure 4:
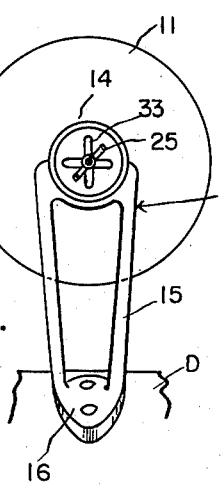
Figure 4 is a fragmentary elevation of the motor vehicle and showing a front end view of the structure illustrated in Figure 1.
Figure 6:
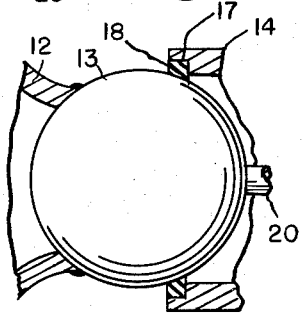
Figure 6 is an enlarged vertical sectional view through portions of the mirror casing, tubular casing, and plastic ring, and showing the intermediate ball and a portion of the rod connected thereto.

In the drawing, A is the rear view mirror, B is the mounting therefor, and C is the means by which the mirror may be initially adjusted or set by hand and by which the mirror will return to such adjusted or set position without further adjustment in the event it should be moved accidentally from said adjusted or set position.

As shown, the mirror A is circular in configuration and is secured within the annular rim 10 of a sheet metal casing 11 of substantially concave or convex configuration provided at the center thereof with a forwardly projecting substantially frusto-conical portion 12 that receives and is rigidly secured to a portion of a metallic ball support 13. Such mirror A, casing 11, and ball support 13 constitute a mirror unit.

The mounting B for the mirror unit comprises an open ended tubular metal casing 14 provided on the underside thereof intermediate its ends with a supporting standard 15 having at its lower end a base 16 that is attached to the body D of a motor vehicle. Preferably the rear end of this tubular casing 14 receives a portion of the ball support 13 and is provided with an annular recess 17 that receives a ring 18 of any suitable material, such as plastic or plastic composition. Thus this ring 18 is between the ball support 13 and tubular casing 14 and prevents metal to metal contact therebetween. Such ring 18 also serves as a bearing to facilitate movement of the ball support 13 relative to the tubular casing 14 during all adjustments of the mirror unit.

The means by which the mirror unit may be adjusted or set by hand and by which the mirror unit will return to such adjusted or set position comprises a metal rod 20, a metal coil tension spring 21, an exteriorly threaded metal shaft 22, a rotatable stamped metal disc 23, a metal lock nut 24, and a metal wing nut 25.

Preferably the rod 20 extends radially within and is detachably connected at one end to the ball support 13. The spring 21 extends between and is terminally connected to the rod 20 and to the shaft 22. Preferably opposite ends of this spring 21 are received within and soldered, brazed or welded to the walls of axially extending sockets 30 and 31 respectively in said rod 20 and shaft 22. The disc 23 is received by and is rotatable about a horizontal axis within an annular recess 32 in the forward end of the tubular casing 14. Preferably this disc 23 has any desired number of radially extending crossed connecting slots 33 therein for the reception of the shaft 22. In this connection, it is to be noted that the shaft 22 extends through one of the cross slots 33 and has an end portion 34 projecting outwardly beyond the disc 23. Actually the shaft 22 is movable from one to another of said crossed slots 33, as desired. The lock nut 24 threadedly engages the shaft 22 in rear of the disc 23 and is engageable with the rear face of the disc 23. Preferably this lock nut 24 has at one side thereof a laterally projecting tubular flange 35 that is concentric with and is sleeved upon the shaft 22. Such tubular flange 35 is engageable with and is movable lengthwise of the crossed slots 33 in said disc and serves as a pilot for said nut 24 and shaft 22 during movement of said shaft 22 in said slots 33. The wing nut 25 is upon the outer side of the disc 23 and threadedly engages the forwardly projecting end portion 34 of the shaft 22. Such wing nut 25 is engageable with the outer face of the disc 23 to hold the shaft 22 and associated parts in adjusted position.

Thus from the foregoing, it will be apparent that the rod 20, spring 21, and shaft 22 are in axial alignment and, as a unit may be adjusted angularly within the tubular casing 14 when the pilot 35 of the lock nut 24 is moved lengthwise of the crossed slots 33 in the disc 23. Such angular adjustment may be accomplished by using the wing nut 25 as a finger piece, when it is loosened on the shaft 22 relative to the disc 23, to move the shaft 22 from one slot 33 to another, and such angular adjustment of the parts mentioned causes the mirror unit comprising the ball 13, casing 11, and mirror A to be correspondingly adjusted relative to the bearing ring 18 in the rear end of the tubular casing 14. The wing nut 25 may then be readily turned on the shaft 22 to a tight position against the disc 23 to maintain the set or adjusted position of the mirror unit.

The tension of the spring 21 may be readily varied as desired by adjusting the relative positions of the lock nut 24 and wing nut 25 on the shaft 22.

The disc 23 may be readily turned or rotated as desired in the annular groove 32 in the tubular casing 14 by inserting a suitable tool (not shown) into one of the crossed slots 33 and then exerting pressure against an edge of such slot, to obtain a finer adjustment or set position of the mirror unit, in the event enough crossed slots are not formed in the disc 23 to provide such adjustment. Such disc 23 will be effectively held in the position to which it is turned or rotated by the frictional engagement existing between said disc and the walls of the groove 32 in the tubular casing and by the wing nut 25 when it is tightened against the disc 23. Thus, with my construction it is possible to obtain any desired adjustment within 360°.

Once the desired adjustment of the mirror unit is obtained, such mirror unit will return automatically to the adjusted or set position in the event such mirror unit should be moved accidentally from said adjusted or set position. Thus a single means including the rod 20, spring 21, and shaft 22 serve both as the means for adjusting the mirror unit to the desired position and for automatically returning such mirror unit to said adjusted position when it is moved accidentally from said adjusted or set position.

In the present instance, all of the parts can be easily and quickly assembled or disassembled whenever desired and thus any of such parts may be individually replaced whenever required.

What I claim as my invention is:

1. A rear view mirror structure, comprising an elongated tubular casing having openings respectively at opposite ends thereof and provided with supporting means, a mirror unit at one end of said tubular casing and including a mirror, and a casing for said mirror having a supporting element provided with a rounded portion substantially closing and movable relative to one of the openings aforesaid, a rotatable disc substantially closing the other of the openings aforesaid and having connecting slots therein, and manually operable means by which the mirror unit may be adjusted relative to said tubular casing and by which said mirror unit will return automatically to said adjusted position in the event such mirror unit is moved accidentally from said adjusted position, including a pair of longitudinally spaced substantially axially aligned elongated members within said tubular casing, one of said elongated members being secured at one end to the mirror supporting element aforesaid, the other of said elongated members extending through one of said connecting slots and having an end portion projecting outwardly beyond said disc, said other elongated member being manually adjustable from one to another of said connecting slots, a tension spring extending between and terminally connected to said longitudinally spaced elongated members at the adjacent ends thereof, and means for holding said other elongated member in adjusted position, including an element upon the outer side of said disc and manually adjustable on the outwardly projecting end portion of said other elongated member.

2. A rear view mirror structure, comprising an elongated tubular casing having openings respectively at opposite ends thereof and provided with supporting means, a mirror unit at one end of said tubular casing and including a mirror, and a casing for said mirror having a supporting element provided with a rounded portion substantially closing and movable relative to one of the openings aforesaid, a closure for the other of the openings aforesaid, said closure having crossed slots therein, and manually operable means by which the mirror unit may be adjusted relative to said tubular casing and by which said mirror unit will return automatically to said adjusted position in the event such mirror unit is moved accidentally from said adjusted position, including a pair of longitudinally spaced substantially axially aligned elongated members within said tubular casing, one of said elongated members being secured at one end to the mirror supporting element aforesaid the other of said elongated members extending through one of said crossed slots and having an end portion projecting outwardly beyond said closure, said other elongated member being manually adjustable from one to another of said crossed slots, an elongated elastic element extending between and terminally connected to said longitudinally spaced elongated members at the adjacent ends thereof, and means for holding said other elongated member in adjusted position, including an element manually adjustable on the outwardly projecting end portion of said other elongated member relative to the outer side of said closure.

3. A rear view mirror structure, comprising an elongated tubular casing having openings respectively at opposite ends thereof and provided with supporting means, a mirror unit at one end of said tubular casing and including a mirror, and a casing for said mirror having a supporting element provided with a rounded portion substantially closing and movable relative to one of the openings aforesaid, a disc substantially closing and movable relative to the other of the openings aforesaid and having crossed slots therein, manually operable means by which the mirror unit may be adjusted relative to said tubular casing and by which said mirror unit will return automatically to said adjusted position in the event such mirror unit is moved accidentally from said adjusted position, including a pair of longitudinally spaced substantially axially aligned elongated members within said tubular casing, one of said elongated members being secured at one end to the mirror supporting element aforesaid, the other of said elongated members extending through one of said crossed slots and having an end portion projecting outwardly beyond said disc, said other elongated member being manually adjustable from one to another of said crossed slots, and a tension spring extending between and terminally connected to said longitudinally spaced elongated members at the adjacent ends thereof, means for holding said other elongated member in adjusted position, including an element manually adjustable on the outwardly projecting end portion of said other elongated member relative to the outer side of said disc, and means adapted to cooperate with said last mentioned element to vary the tension of said spring, including a nut manually adjustable on said other elongated member relative to the inner side of said disc, said nut having a laternally projecting tubular portion sleeved upon said other elongated member and movable from one to another of said crossed slots to serve as a pilot for said other elongated member during adjustment of the latter in said slots.

4. A rear view mirror structure, comprising an elongated tubular casing having open opposite ends and provided between said open ends with supporting means, a mirror unit at one open end of said tubular casing and including a mirror, and a casing for said mirror having a supporting element provided with a rounded portion substantially closing and movable relative to said one open end of said tubular casing, a closure for the other open end of said tubular casing, said closure having connecting slots therein, and manually operable means by which the mirror unit may be adjusted relative to said tubular casing and by which said mirror unit will return automatically to said adjusted position in the event such mirror unit is moved accidentially from said adjusted position, including a pair of longitudinally spaced substantially axially aligned elongated members within said tubular casing, one of said elongated members being secured at one end to the mirror supporting element aforesaid, the other of said elongated members extending through one of said connecting slots and having an end portion projecting outwardly beyond said closure, said other elongated member being manually adjustable from one to another of said connecting slots, and a tension spring extending between and terminally connected to said longitudinally spaced elongated members at the adjacent ends thereof, means for holding said other elongated member in adjusted position, including an element manually adjustable on the outwardly projecting end portion of said other elongated member relative to the outer side of said closure, and means adapted to cooperate with said last mentioned element to vary the tension of said spring, including an element manually adjustable on said other elongated member relative to the inner side of said adjustable element.

5. A rear view mirror structure comprising an elongated tubular casing having open opposite ends and provided between said open ends with supporting means, a mirror unit at one open end of said tubular casing and including a mirror, and a casing for said mirror having a supporting element provided with a spherical portion substantially closing and movable relative to said one open end of said tubular casing, an annular bearing for said spherical portion carried by said one open end of the tubular casing, a rotatable element substantially closing and movable relative to the other open end of said tubular casing, said rotatable element having crossed connecting slots therein, said slots extending radially relative to the axis of said tubular casing, and manually operable means by which the mirror unit may be adjusted relative to said tubular casing and by which said mirror unit will return automatically to said adjusted position in the event said mirror unit is moved accidentally from said adjusted position, including three substantially aligned elongated members connected together in end to end relation and located within and extending axially of said tubular casing, one of said elongated members intermediate the other two being formed of elastic material, one of said other two elongated members being secured at one end to the mirror supporting element aforesaid, the second of said other two elongated members extending through one of the crossed slots aforesaid and having an end portion projecting outwardly beyond said rotatable element, the second of said other two elongated members being manually adjustable from one to another of said crossed slots, and an element adjustable on the outwardly projecting end portion aforesaid relative to the outer side of said rotatable element to maintain the second of said other two elongated members in adjusted position.

References Cited in the file of this patent

UNITED STATES PATENTS

| | | |
|---|---|---|
| 1,487,635 | Watts | Mar. 18, 1924 |
| 1,590,421 | Coffman | June 29, 1926 |
| 1,599,066 | Rushmore | Sept. 7, 1926 |
| 1,932,697 | Jankovic | Oct. 31, 1933 |
| 1,989,437 | Weisz | Jan. 29, 1935 |
| 2,534,495 | Younghusband | Dec. 19, 1950 |
| 2,567,324 | Davis | Sept. 11, 1951 |
| 2,632,363 | Persson | Mar. 24, 1953 |
| 2,644,363 | Capitani | July 7, 1953 |
| 2,724,996 | O'Shei | Nov. 29, 1955 |
| 2,746,356 | Wells | May 22, 1956 |